United States Patent
Yamamoto et al.

[11] Patent Number: 6,131,493
[45] Date of Patent: *Oct. 17, 2000

[54] TORQUE TRANSMISSION MEMBER

[76] Inventors: Toshiji Yamamoto, 30-3-413, Motobuto 3-chome, Urawa-shi, Saitama-ken 336; Michihiko Tanaka, 1273-1, Oh-aza wakasato, Nagano-shi, Nagano-ken 380, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/849,684
[22] PCT Filed: Oct. 25, 1996
[86] PCT No.: PCT/JP96/03115
§ 371 Date: Jun. 12, 1997
§ 102(e) Date: Jun. 12, 1997
[87] PCT Pub. No.: WO97/15762
PCT Pub. Date: Jan. 5, 1997

[30] Foreign Application Priority Data

Oct. 27, 1995 [JP] Japan ................................ 7-280796

[51] Int. Cl.⁷ ...................................................... B25B 13/00
[52] U.S. Cl. ............................ 81/124.7; 81/186; 81/121.1
[58] Field of Search ............................... 81/121.1, 124.7, 81/186

[56] References Cited

U.S. PATENT DOCUMENTS

| | | | |
|---|---|---|---|
| 4,765,009 | 8/1988 | Hung | 81/124.7 X |
| 4,938,731 | 7/1990 | Nguyen et al. | |
| 5,019,080 | 5/1991 | Hemer | |
| 5,020,954 | 6/1991 | Dreger | |
| 5,279,190 | 1/1994 | Goss et al. | 81/121.1 X |
| 5,388,486 | 2/1995 | Ruzicka et al. | 81/121.1 X |

FOREIGN PATENT DOCUMENTS 2807957  2/1978  Germany.

*Primary Examiner*—James G. Smith
*Attorney, Agent, or Firm*—Volpe and Koenig, P.C.

[57] ABSTRACT

A torque transmission unit according to the invention comprises a bolt (1) which has curved outer peripheral surfaces (3) with a peripheral outline consisting of circular arcs circumscribing the sides of a square (α), respectively, and a socket wrench (2) which has curved inner peripheral surfaces (4) with a peripheral outline consisting of circular arcs circumscribing the sides of a square (β), respectively. The curved inner peripheral surfaces (4) of the socket wrench (2) are brought into contact with the curved outer peripheral surfaces (3) of the bolt (1) and slid thereon by rotating the socket wrench (2). As a result, clamping can be performed with the axis of rotation of the wrench (2) made to coincide with that of rotation of the bolt (1). By virtue of this structure, any corner portion of the bolt (1) is prevented from being rounded. Further, since in the structure, automatic axis alignment is performed between the bolt (1) and the socket wrench (2), clamping is performed in a reliable manner.

9 Claims, 7 Drawing Sheets

(1) Δ = 0.05

| NORMAL RADIUS | DESIGN CONDITIONS | h₁ | h₂ | Ro | R₁ | θ° | φ° | tan α | b/b |
|---|---|---|---|---|---|---|---|---|---|
| M3 | β=5.0, a=2.5, e=0.2, Rk=2.165, R=1.768 | 3.1069 | 3.4727 | 1.8569 | 2.2727 | 26.716 | 35.307 | 1.883 | 2.8499 |
| M4 | β=6.0, a=3.0, e=0.3, Rk=2.598, R=2.1213 | 3.6242 | 3.9495 | 2.1242 | 2.4995 | 28.530 | 34.247 | 1.9439 | 3.07134 |
| M5 | β=8.0, a=4.0, e=0.3, Rk=3.461, R=2.828 | 5.3623 | 5.80214 | 3.3623 | 3.85214 | 25.028 | 35.183 | 1.7468 | 3.63613 |
| M6 | β=10, a=5, e=0.4, Rk=4.330, R=3.535 | 6.7482 | 4.73848 | 4.2482 | 4.73848 | 25.227 | 34.835 | 1.7365 | 4.0524 |
| M8 | β=12, a=6, e=0.5, Rk=5.1962, R=4.2426 | 8.1351 | 8.57577 | 5.1351 | 5.62577 | 25.358 | 34.605 | 1.7295 | 4.42981 |
| M10 | β=16, a=8, e=0.6, Rk=6.9282, R=5.6569 | 11.373 | 11.8715 | 7.3733 | 7.92153 | 24.102 | 34.879 | 1.6311 | 5.161 |
| M12 | β=20, a=10, e=0.7, Rk=8.6603, R=7.0711 | 14.656 | 15.1937 | 9.6559 | 10.2437 | 23.352 | 35.045 | 1.6253 | 5.8014 |
| M16 | β=28, a=14, e=1, Rk=12.124, R=9.8995 | 20.725 | 21.2711 | 13.725 | 14.321 | 23.303 | 34.909 | 1.6514 | 6.8614 |
| M20 | β=34, a=17, e=1, Rk=14.724, R=12.021 | 26.602 | 27.235 | 18.102 | 27.2347 | 21.789 | 35.454 | 1.5542 | 7.6533 |
| M24 | β=38, a=19, e=1, Rk=16.155, R=13.435 | 30.611 | 31.294 | 21.111 | 21.844 | 21.045 | 35.724 | 1.5264 | 8.13976 |
| M30 | β=44, a=22, e=1.5, Rk=19.053, R=15.556 | 33.442 | 34.0234 | 22.442 | 23.073 | 22.745 | 34.992 | 1.5841 | 8.633 |
| M36 | β=54, a=27, e=1.5, Rk=23.383, R=19.092 | 43.387 | 44.060 | 29.887 | 30.610 | 21.262 | 35.549 | 1.5288 | 9.68155 |

| NORMAL RADIUS | DESIGN CONDITIONS | h₁ | h₂ | R₀ | R₁ | θ° | φ° | tan α | b/b |
|---|---|---|---|---|---|---|---|---|---|
| M3 | β=5.0, a=2.5, e=0.2, Rk=2.165, R=1.768 ROTATIONAL PLAY=6.52887° | 2.7308 | 3.2577 | 1.4808 | 2.1077 | 29.987 | 36.193 | 1.7678 | 1.9956 |
| M4 | β=6.0, a=3.0, e=0.3, Rk=2.598, R=2.1213 ROTATIONAL PLAY=7.76789° | 3.0033 | 3.5876 | 1.5033 | 2.23746 | 33.569 | 35.677 | 1.9439 | 2.598 |
| M5 | β=8.0, a=4.0, e=0.3, Rk=3.461, R=2.828 ROTATIONAL PLAY=6.19701° | 4.4791 | 5.33497 | 2.47791 | 3.48497 | 28.729 | 36.317 | 2.149 | 2.0723 |
| M6 | β=10, a=5, e=0.4, Rk=4.330, R=3.535 ROTATIONAL PLAY=6.52887° | 5.4615 | 6.5154 | 2.9615 | 4.2154 | 29.687 | 36.192 | 1.9956 | 1.9956 |
| M8 | β=12, a=6, e=0.5, Rk=5.1962, R=4.2426 ROTATIONAL PLAY=6.74512° | 6.4509 | 7.70151 | 3.4509 | 7.70151 | 30.328 | 36.108 | 1.9483 | 1.91832 |
| M10 | β=16, a=8, e=0.6, Rk=6.9282, R=5.6569 ROTATIONAL PLAY=6.19701° | 8.9582 | 10.6699 | 4.9582 | 6.96994 | 28.729 | 36.317 | 2.1491 | 2.072 |

| NORMAL RADIUS | DESIGN CONDITIONS | h₁ | h₂ | Ro | R₁ | θ° | φ° | tan α | b/b |
|---|---|---|---|---|---|---|---|---|---|
| M12 | β=20, a=10, e=0.7, Rk=8.6603, R=7.0711 ROTATIONAL PLAY=5.85596° | 11.495 | 13.6626 | 6.4958 | 9.01261 | 27.776 | 36.440 | 2.0702 | 2.1569 |
| M16 | β=28, a=14, e=1, Rk=12.124, R=9.8995 ROTATIONAL PLAY=5.95438° | 15.971 | 18.9948 | 8.9713 | 12.4948 | 28.049 | 35.440 | 2.0922 | 2.1319 |
| M20 | β=34, a=17, e=1, Rk=14.724, R=12.021 ROTATIONAL PLAY=5.05973° | 20.848 | 24.5944 | 12.348 | 16.5944 | 25.660 | 36.405 | 1.9105 | 2.3827 |
| M24 | β=38, a=19, e=1, Rk=16.155, R=13.435 ROTATIONAL PLAY=4.59784° | 24.249 | 28.4382 | 14.749 | 19.4382 | 24.494 | 36.860 | 1.8307 | 2.53711 |
| M30 | β=44, a=22, e=1.5, Rk=19.053, R=15.556 ROTATIONAL PLAY=5.72972° | 25.543 | 30.3289 | 14.543 | 20.0789 | 27.431 | 36.484 | 2.0426 | 2.1899 |
| M36 | β=54, a=27, e=1.5, Rk=23.383, R=19.092 ROTATIONAL PLAY=4.81781° | 33.803 | 39.760 | 20.303 | 27.010 | 25.044 | 36.79 | 1.8667 | 2.46108 |

FIG.9B

TORQUE TRANSMISSION MEMBER

TECHNICAL FIELD

This invention relates to a torque transmission unit comprising a male clamp member such as a bolt and a female clamp member such as a wrench, and more particularly to a torque transmission unit comprising male and female clamp members which have engaging portions thereof designed such that they can transmit a large amount of torque without greatly damaging the male and/or female clamp member.

BACKGROUND ART

In general, a male clamp member such as a bolt, a screw, etc. is fastened to a work by means of a female clamp member such as a wrench, a driver, etc. At this time, it is important to cause effective transmission of torque between the male clamp member (located radially inside) and the female clamp member (located radially outside).

To this end, the conventional torque transmission unit employs a male clamp member with a hexagonal head portion and a female clamp member with a socket portion of a similar shape to the head portion, or employs a female clamp member with a cross-shaped groove and a male clamp member with a corresponding cross-shaped projection.

In the conventional clamp method, however, application of excessive torque may well round a corner portion of the male clamp member and/or a groove portion of the female clamp member.

This is because there is a clearance for fitting between engaging surfaces of the male and female clamp members. The clearance permits slight rotation of the male clamp member in the female clamp member, resulting in, for example, concentration of a clamp force on a corner portion of the male clamp member. As a result, the corner portion will be rounded or deformed. Such rounding or deformation will interrupt effective transmission of torque.

Moreover, while the male clamp member rotates in the female clamp member, the axis of rotation of the former may well deviate from that of the latter. In such a state, torque cannot uniformly be applied to the clamp members, with the result that even a relatively small amount of torque may round a corner portion, etc. of the male clamp member, thereby interrupting effective transmission of torque.

Thus, in the conventional torque transmission unit, it is necessary to perform clamping while adjusting the amount of torque so as not to damage the clamp members.

The present invention has been developed in light of the above-described circumstances, and aims to provide a torque transmission unit capable of transmitting a large amount of torque without greatly damaging male and female clamp members incorporated therein.

DISCLOSURE OF INVENTION

According to a first aspect of the invention, to perform clamping, a female clamp member which has curved inner peripheral surfaces with an outline consisting of circular arcs circumscribing the sides of a square, respectively, is engaged with a male clamp member which has curved outer peripheral surfaces with an outline consisting of circular arcs circumscribing the sides of a square, respectively.

According to a second aspect of the invention, each curved inner peripheral surface of the female clamp member is made to have a smaller curvature than each curved outer peripheral surface of the male clamp member, such that the curved outer peripheral surfaces rotate relative to the curved inner peripheral surfaces and slide thereon.

According to a third aspect of the invention, each of the curved inner peripheral surfaces of the female clamp member and a corresponding one of the curved outer peripheral surfaces of the male clamp member are brought into contact with each other when the female clamp member is rotated in a direction through a predetermined angle relative to the male clamp member, and are brought out of contact from each other when the female clamp member is rotated in a direction opposite to the aforementioned direction.

According to a fourth aspect of the invention, the male clamp member and the female clamp member are made to have the same axis of rotation by rotating the male and female clamp members relative to each other, thereby bringing each of the curved outer peripheral surfaces of the male clamp member into contact with a corresponding one of the curved inner peripheral surfaces of the female clamp member, and sliding them on each other.

As described above, the clamp member of the invention has curved engagement surfaces designed on the basis of a square. At the time of clamping, while the female and male clamp members rotate relative to each other, their axes of rotation are always automatically aligned and the curved surfaces of the female clamp member are brought into contact with those of the male clamp member. As a result, the pressure applied to the curved surfaces is uniformly dispersed, thereby avoiding an ununiform contact stress distribution which may occur in the case of using, for example, a bolt with a hexagonal hole. Further, a large contact area can be secured between the clamp members by adjusting the curvatures of their curved surfaces. Also, the curved surfaces can secure the contact of the clamp members even if they are eccentric from each other, and enable the aforementioned automatic axis alignment when torque is applied thereto. In addition, elastic deformation of contact portions of the clamp members is corrected by relative smooth sliding of the curved surfaces, thereby enabling more smooth clamping than in the conventional torque transmission member which does not perform smooth sliding.

As compared with clamp members designed on the basis of a regular hexagon or triangle, the clamp members of the invention designed on the basis of a square can have a long contact area, and receive a uniform torque. Therefore, the possibility that only one of the clamp members will be damaged is very low, and hence torque can be transmitted in a reliable manner.

Secondly, since the engagement outer peripheral surfaces of the male clamp member are curved, they can be brought into contact with the similarly-curved inner peripheral surfaces of the female clamp member in a sliding manner, and can have large contact portions. Accordingly, the mechanical shock exerted upon the male clamp member can be minimized, and the pressure applied to the contact portions of the male and female clamp members can be minimized. As a result, the torque transmission member of the invention is effectively prevented from damage.

Furthermore, since the engagement outer peripheral surfaces of the male clamp member are curved, a clamping force can be applied to the portions of the male clamp member which correspond to the outer edge portions of the reference square, and even a small amount of torque can be effectively transmitted.

In the case of fastening a bolt by a socket wrench, etc., the bolt and the socket wrench function as the male clamp member and the female clamp member, respectively. On the other hand, in the case of fastening a screw by a driver, the driver and the screw function as the male clamp member and the female clamp member, respectively.

BRIEF DESCRIPTION OF DRAWINGS

FIG. 8 is a table, showing examples of calculated dimensions of the torque transmission unit of the invention;

FIGS. 9A and 9B are tables, showing other examples of calculated dimensions of the torque transmission unit of the invention.

BEST MODE OF CARRYING OUT THE INVENTION

The embodiment of the invention will be described with reference to the accompanying drawings.

Figure 1:
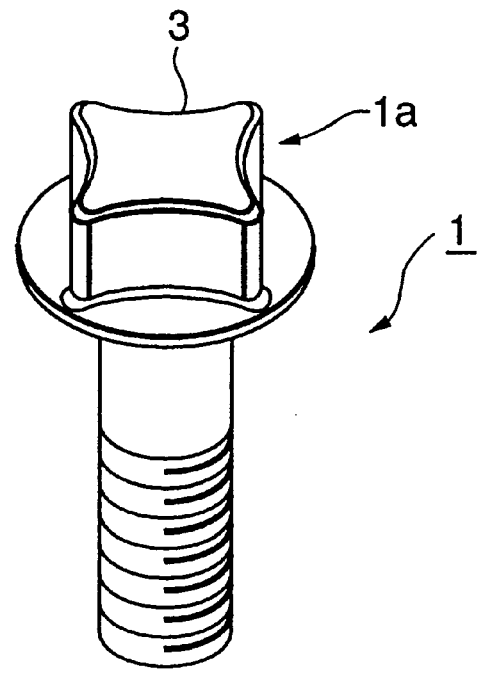
FIG. 1 is a perspective view, showing a preferable male clamp member (bolt) according to the invention.
Figure 2:
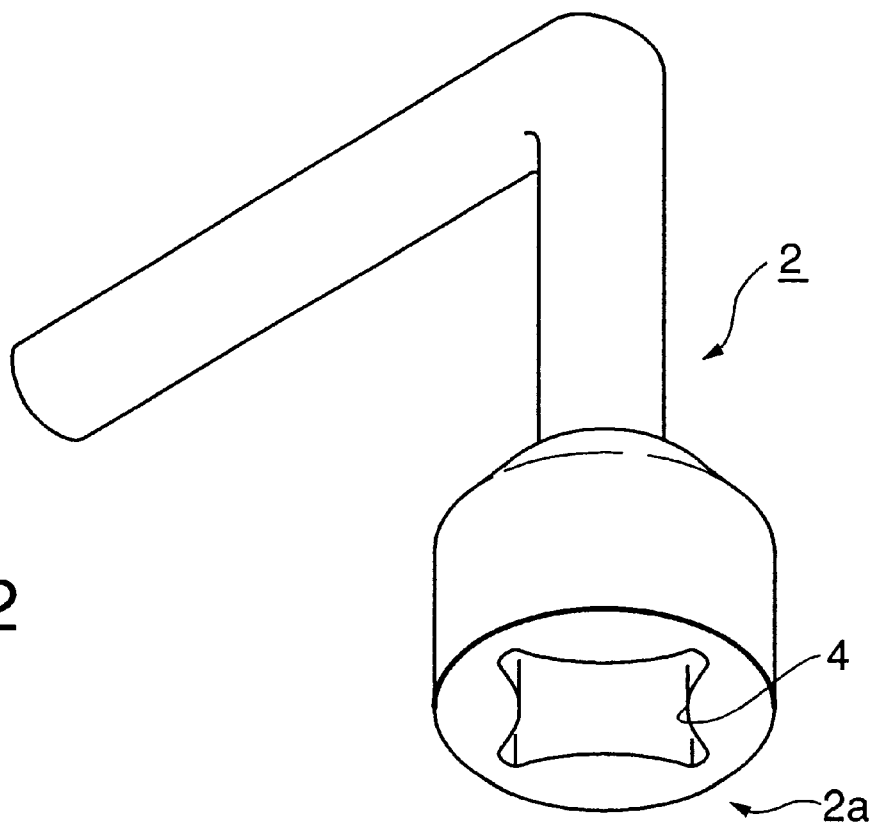
FIG. 2 is a perspective view, showing a preferable female clamp member (socket wrench) according to the invention.

FIG. 1 is a perspective view, showing a bolt 1 as a male clamp member, and FIG. 2 is a perspective view, showing a socket wrench 2 as a female clamp member. The invention is characterized by the improved configurations of a head portion 1a of the bolt 1 and a socket portion 2a of the socket wrench 2, which will be described referring to FIGS. 3A and 3B.

Figure 3A:
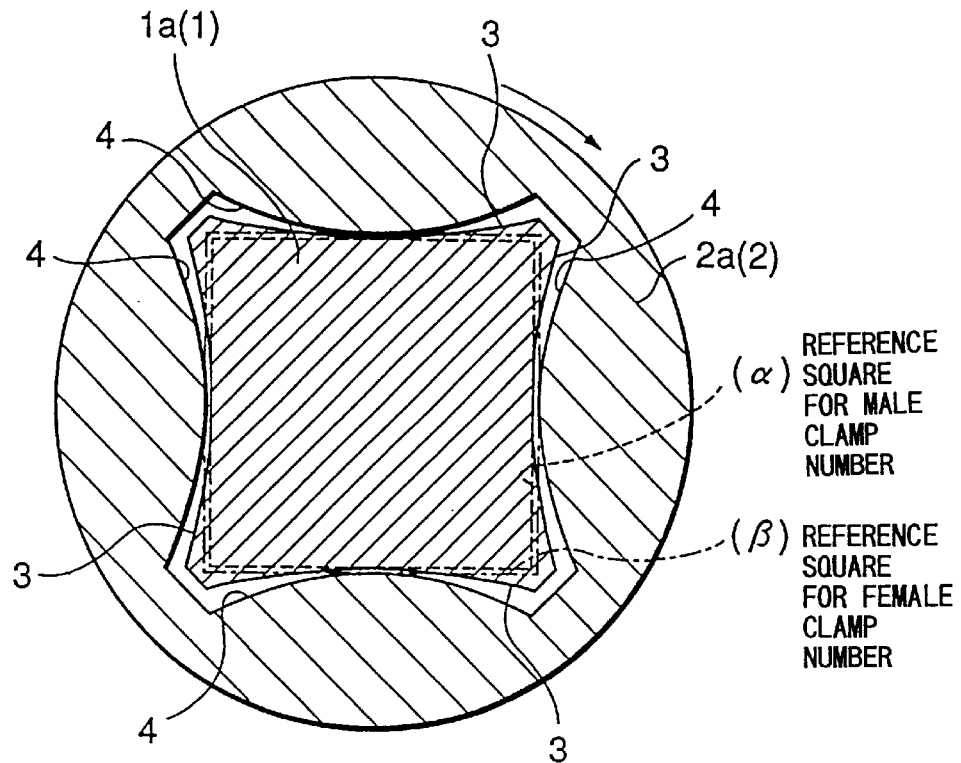
FIGS. 3A and 3B are cross sectional views, showing the engagement states of male and female clamp members, which are assumed before and after clamping is performed, respectively.

FIG. 3A is a cross sectional view, showing a state in which the socket portion 2a of the socket wrench 2 is fitted on the outer periphery of the head portion 1a of the bolt 1. The head portion 1a of the bolt 1 has four curved outer peripheral surfaces 3 whose peripheral outline consists of four circular arcs respectively circumscribing the four sides of a reference square indicated by broken line ($\alpha$) in FIG. 3A. Similarly, the socket portion 2a of the socket wrench 2 has four curved inner peripheral surfaces 4 whose peripheral outline consists of four circular arcs respectively circumscribing the four sides of a reference square indicated by one-dot chain line ($\beta$) in FIG. 3A and being larger than the square ($\alpha$). The circular arcs of the curved inner peripheral surfaces 4 have a smaller curvature than those of the curved outer peripheral surfaces 3.

As is shown in FIG. 3A, there is a clearance between the curved outer peripheral surfaces 3 of the bolt 1 and the curved inner peripheral surfaces 4 of the socket wrench 2. The clearance is smallest between center portions of each pair of the surfaces 3 and 4. By virtue of the clearance, the socket portion 2a of the socket wrench 2 can smoothly be engaged with the head portion 1a of the bolt 1.

To perform clamping, the socket wrench 2 is rotated, for example, clockwise from the position shown in FIG. 3A. Thus, only the socket wrench 2 is rotated, thereby putting the curved inner peripheral surfaces 4 into contact with the curved outer peripheral surfaces 3 of the bolt 1. Subsequently, the socket wrench 2 and the bolt 1 are slightly slid with the curved surfaces 3 and 4 kept in contact. As a result, the socket wrench 2 and the bolt 1 assume positions as shown in FIG. 3B, where relative sliding of the socket wrench and the bolt is stopped.

Figure 3B:
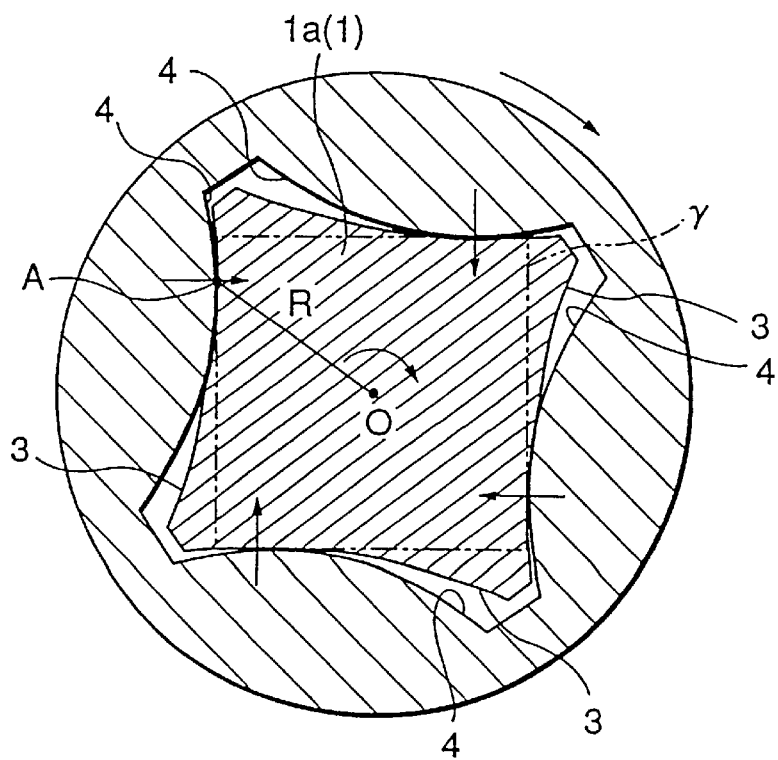

In this state, a square indicated by two-dot chain line ($\gamma$) in FIG. 3B can be drawn within the bolt 1. This square ($\gamma$), which inscribes both the curved surfaces 3 and 4, is a little smaller than the square ($\alpha$) shown in FIG. 3A.

Accordingly, further application of torque from the socket wrench 2 to the bolt 1 rotates the bolt 1 together with the socket wrench 2 so as to drive the square ($\gamma$), and fastens the bolt 1 to a work (not shown).

The above-described structure can provide the following advantages:

First, at the start of clamping, the bolt 1 receives no mechanical shock, and the axes of rotation of the bolt 1 and the socket wrench 2 coincide with each other.

More specifically, until the state of FIG. 3A is shifted to the state of FIG. 3B at the start of clamping, the curved inner peripheral surfaces 4 of the socket wrench 2 are gradually brought into contact with the curved outer peripheral surfaces 3 of the bolt 1. Then, the curved surfaces 4 of the socket wrench 2 are slid on the curved surfaces 3 of the bolt 1 and put into complete contact therewith. Thus, the bolt 1 receives no mechanical shock. Further, even when the bolt 1 and the socket wrench 2 start to rotate about different axes, they will be adjusted to rotate about the same axis, since sliding of the four pairs of the curved inner and outer peripheral surfaces 3 and 4 does not stop until the forces acting upon them balance.

As a result, the bolt 1 is prevented from being cracked or rounded by a mechanical shock applied thereto at the start of clamping. Further, since the socket wrench 2 and the bolt 1 rotate about the same axis by virtue of automatic axis alignment, they receive a uniform clamping force, and hence rounding, etc. of any corner portion of the bolt 1 is effectively prevented.

In a case where the head portion of the bolt 1 has a square cross section as indicated by the broken line ($\alpha$) in FIG. 3A (i.e. the head portion has no curved outer peripheral surfaces but flat outer peripheral surfaces), the outer peripheral surfaces of the bolt 1 are put into contact with those portions of the curved inner peripheral surfaces, which are closer to center portions thereof, than in the case of the square ($\gamma$) shown in FIG. 3B. Accordingly, the bolt 1 and the socket wrench 2 are locked earlier than in the latter case. This means that the period of sliding is inevitably shorter and hence a greater mechanical shock is exerted upon the bolt 1 than in the case of the above-described embodiment. In addition, at the time of locking, it is possible that a corner portion of the square head portion of the bolt 1 will eat into a portion of the curved inner peripheral surfaces.

On the other hand, in a case where the head portion of the bolt 1 has a square cross section as indicated by the two-dot chain line ($\gamma$) in FIG. 3B, the clearance between the bolt 1 and the socket wrench 2 is too large when they are situated in the positions shown in FIG. 3A, with the result that a great backlash will occur between the bolt 1 and the socket wrench 2, and the bolt 1 may well receive a mechanical shock at the start of clamping. Furthermore, a corner portion of the bolt 1 may eat into a portion of the curved inner peripheral surfaces.

Figure 5:
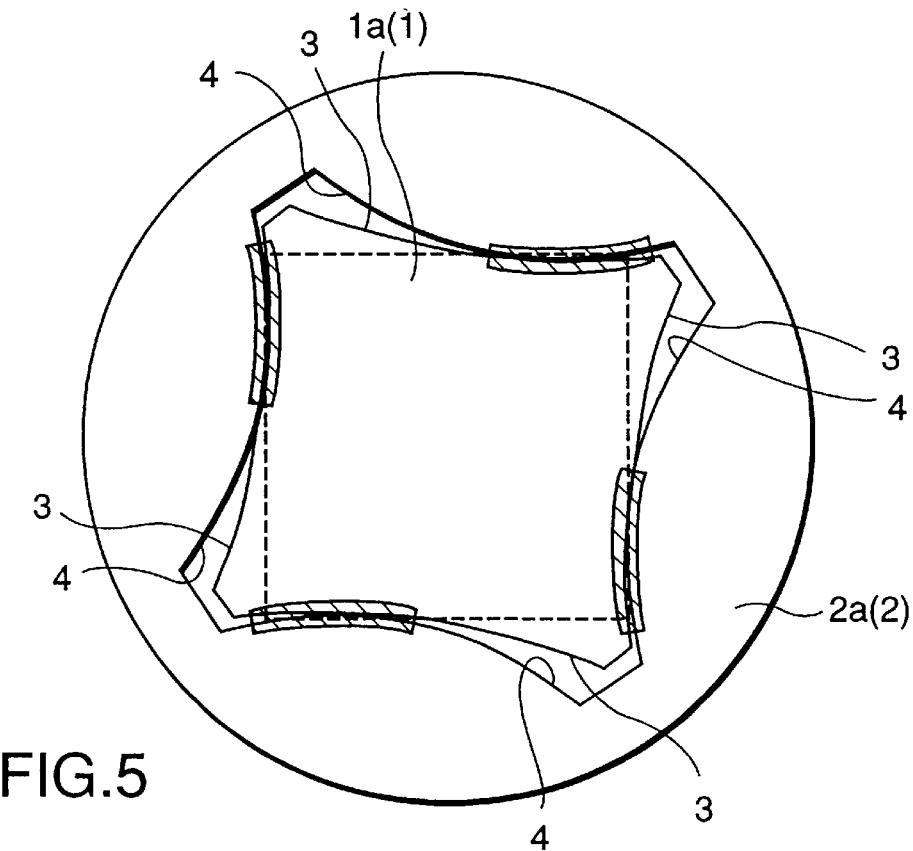
FIG. 5 is a view, useful in explaining the lengths of contact portions of curved outer and inner peripheral surfaces.

Second, determining the configuration of the cross section of the bolt 1 based on the reference square enables transmission of torque with relatively wide portions of the bolt 1 and the socket wrench 2 put in contact, as is indicated by the hatched areas in FIG. 5.

This effect will be explained, taking, as a comparative, the case of determining the configuration of the cross section of the bolt 1 based on a hexagon. In the case of the configuration of the head portion 1a of the bolt 1 shown in FIG. 4A, torque from the socket wrench 2 is not directly applied to an area within the circle, and hence it is necessary to apply the torque to the area at the time of clamping.

Figures 4A, 4B:
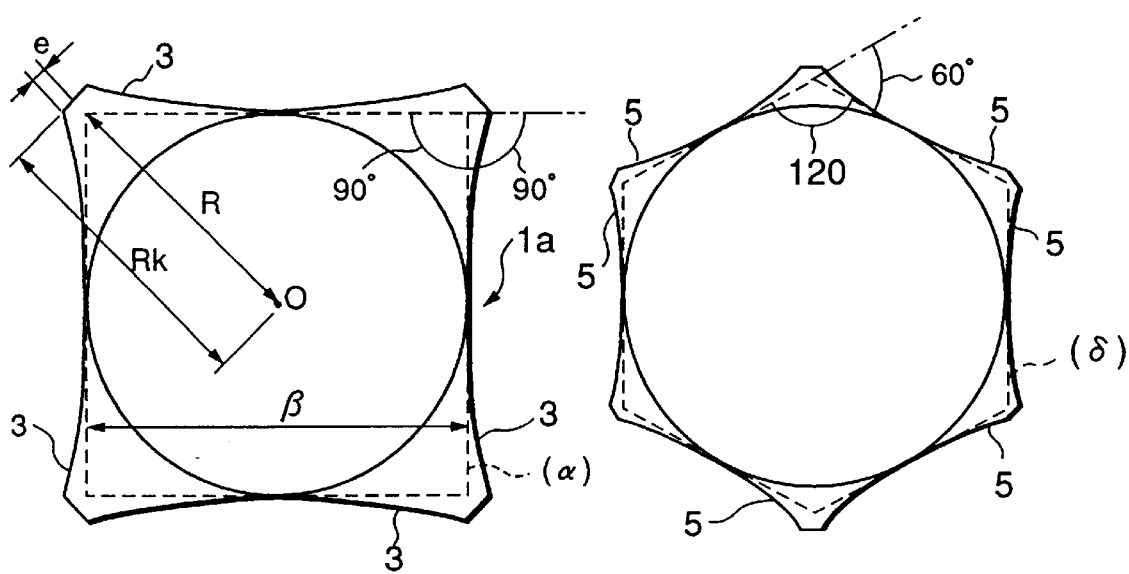
FIGS. 4A and 4B are views, useful in explaining the lengths of curved surfaces of the clamp members.

Suppose a hexagon as indicated by the broken line in FIG. 4B, which circumscribes the circle. If curved outer peripheral surfaces based on the hexagon are obtained in a manner similar to the above, they have a peripheral outline of a configuration indicated by solid lines 5 in FIG. 4B.

The peripheral lengths of the curved outer surfaces 3 and 5 will be compared with each other.

Which one of the peripheral lengths of the curved outer surfaces 3 and 5 is longer can be known by comparing the peripheral length of the square ($\alpha$) indicated by the broken line in FIG. 4A, with the peripheral length of the hexagon indicated by the broken line in FIG. 4B. This is because the length of each arc substantially corresponds to that of a corresponding side.

Supposing an equilateral polygon having n-sides (n: positive integer) and circumscribing a circle, the peripheral length l of the polygon is given by $$l = 2 \cdot n \cdot r \cdot \tan(\pi/n) \quad r: \text{Radius of Circle}$$

It is understood from this that the greater the number n of sides, the shorter the peripheral length l.

Accordingly, it is evident that the smaller the number n of sides, the greater the total length of curved outer peripheral surfaces (3, 5) based on an equilateral polygon having n-sides.

Further, the smaller the number n of sides, the greater the ratio of the length of each curved outer peripheral surface corresponding to each side of the polygon, to the length of each side. This is also evident from the fact that the greater the number n of sides, the closer to a circle the peripheral outline of the curved outer peripheral surfaces.

Thus, the peripheral outline of curved outer peripheral surfaces based on a square has a rather long length as compared with the case based on a hexagon. The same can be said of the socket wrench for fastening the bolt.

As described above, in the invention, rather larger portions of the socket wrench 2 and the bolt 1 can be put into contact at the time of clamping, thereby reducing the pressure applied to the contact portions. As a result, damage of the bolt 1 and the socket wrench 2 can effectively be prevented.

III) In the invention, the force acting upon the bolt 1 is substantially equal to that acting upon the socket wrench 2, which means that the possibility that only one of them will be damaged is very low, and hence the invention has a high durability.

Specifically, as is indicated by ($\alpha$) and ($\gamma$) in FIGS. 3A and 3B, the size of the reference square relative to the peripheral outline of the bolt 1 differs between the FIG. 3A state assumed before clamping and the FIG. 3B state assumed at the start of clamping. As is aforementioned, this difference enables the mechanical shock applied to the bolt at the start of clamping to be reduced, and also enables the torque of the socket wrench to be applied to the portions of the bolt closer to its corners.

Furthermore, in the invention, the position (attitude) of the reference square relative to the peripheral outline of the bolt 1 differs between the FIGS. 3A and 3B cases. As is indicated by the arrows in FIG. 3B, the torque or clamping force can be applied to each side of the reference square ($\gamma$) at right angles at the time of clamping.

This effect occurs partly because the square generally has equal interior and exterior angles. In the FIG. 4B bolt based on an equilateral hexagon, the interior and exterior angles are 120° and 60°, respectively, and each of the total interior angle and the total exterior angle is 360°. In this case, the clamping torque is exerted upon each side of the hexagonal bolt at an angle corresponding to the difference between the interior and exterior angles.

On the other hand, in the FIG. 4A bolt based on a square, the interior angle and the exterior angle are both 90°, and therefore the clamping torque acts upon each side of the square at right angles. As a result, the force acting upon the bolt 1 is equal to that acting upon the socket wrench 2, and accordingly there is no possibility of damaging one of them by the other and the torque is effectively transmitted.

IV) In the invention, a larger clearance is defined between the bolt 1 and the socket wrench 2 than in the case of a usual bolt with a square cross section. This facilitates fitting of the socket portion 2a on the outer periphery of the head portion 1a of the bolt 1.

Specifically, in the usual square bolt, it is necessary to define a constant clearance between the overall surfaces of the socket wrench and the bolt, and also to minimize the width of the clearance so as to restrain the rotation of the bolt in the socket wrench to the utmost. This makes it very difficult to fit the socket wrench on the outer periphery of the square bolt.

In the bolt 1 of the invention, however, to fit the socket wrench 2 on the outer periphery of the bolt 1, it suffices if only the portion of the clearance which corresponds to a center portion of each curved outer peripheral surface 3 in FIG. 3A is appropriately widened. Moreover, such a strict limitation in design as in the conventional case is not applied to that portion of the clearance, in light of the fact that the bolt 1 is rotated and put into surface contact with the socket wrench 2 as shown in FIG. 3B.

In addition, since each curved inner peripheral surface 4 of the socket wrench 2 has a smaller curvature than each curved outer peripheral surface 3 of the bolt 1, a rather wider clearance is defined at both opposite end portions of each curved outer peripheral surface 3 than at each center portion thereof, as is shown in FIG. 3A.

Accordingly, the torque transmission unit of the invention can have a rather wide clearance as compared with the conventional unit, thereby facilitating fitting of the socket wrench 2 on the outer periphery of the bolt 1.

The torque transmission unit of the invention will now be examined geometrically.

Figure 6:
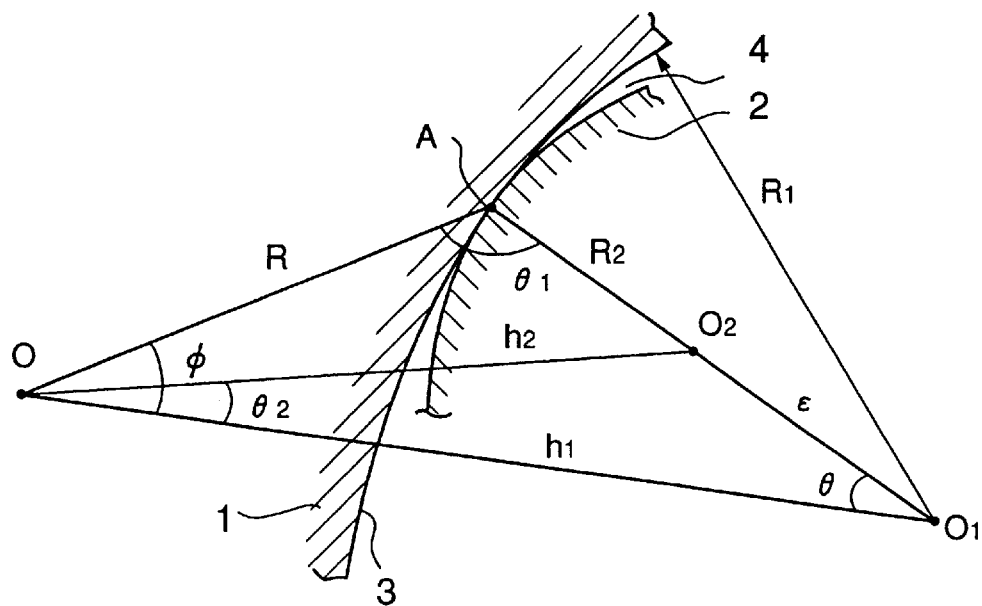
FIG. 6 is a view, useful in geometrically analyzing dimensions of the clamp members.

FIG. 6 shows a state in which the curved outer peripheral surface 3 of the bolt 1 contacts the curved inner peripheral surface 4 of the socket wrench 2. In FIG. 6, reference sign O denotes the axis of the bolt 1, reference sign $R_1$ the radius of curvature of the curved outer peripheral surface 3 of the bolt 1, $O_1$ the center of curvature of the surface 3, $R_2$ the radius of curvature of the curved inner peripheral surface 4 of the socket wrench 2, and $O_2$ the center of curvature of the surface 4. $OO_1=h_1$, and $OO_2=h_2$.

When the socket wrench 2 is rotated, the curved inner peripheral surface 4 of the socket wrench 2 is put into contact, at point A, with the curved outer peripheral surface 3 of the head portion 1a of the bolt 1, after the wrench 2 rotates relative to the bolt 1 through a certain angle. At this time, the lines connecting O, $O_1$ and $O_2$ form a triangle. Since $\epsilon = O_1O_2 = R_1 - R_2$, $\angle OO_1O_2 = \theta$ is given by the following equation based on the laws of cosines:

$$\cos \theta = (\epsilon^2 + h_1^2 - h_2^2)/(2\epsilon h_1) \tag{1}$$

The length R of OA is given by the following equation based on $AO_1 = R_1$ and the law of cosines concerning $\triangle OO_1A$:

$$R^2 = R_1^2 + h_1^2 - 2R_1h_1 \cos \theta \tag{2}$$

Further, $\angle AOO_1 = \phi$ is given by the following equation based on the law of sines:

$$\sin \phi = R_1 \sin \theta / R \tag{3}$$

At this time, an angle α (pressure angle) formed by a line passing point A and perpendicular to line segment OA and a tangential line at point A is given by $$\alpha = \theta + \phi \tag{4}$$

A minimum clearance Δ between the bolt 1 and the socket wrench 2 in FIG. 3A is given by $$\Delta = (h_2 - R_2) - (h_1 - R_1) = \epsilon - (h_1 - h_2)$$

Since a transmission torque T is exerted upon four contact surfaces, pressure P applied to each contact surface (including point A) is given by $$P = T/(4R)$$

Also, normal force N and tangential force F exerted upon the contact surface are expressed by $$N = P \sin \alpha, \quad F = P \cos \alpha$$

The conditions for preventing self-locking of two curved peripheral surfaces which contact each other are expressed by $$\tan \alpha < \mu_s$$

where $\mu_s$ represents a maximum statical friction coefficient at each contact surface.

Preventing the self-locking contributes to effective prevention of eating of contact members (i.e. the bolt 1 and the socket wrench 2) due to elastic deformation thereof at the time of clamping or releasing a clamp state.

Moreover, the contact portions of the curved surfaces have a common contact surface limited by their elastic deformation. This contact surface is expressed by $$b^2 = [\{2N(1-\nu)\}/\pi \iota E][(1/R_1) - (1/R_2)]$$

where b represents the width of the contact surface, ι the length of the contact surface, E Young's modulus, and ν Poisson's ratio.

Further, maximum contact pressure $P_{max}$ is given by the following equation based on the formula of Hertzian contact:

$$P_{max} = 2N/(\pi \iota b)$$

Examples of calculated dimensions of the torque transmission unit of the invention will now be described.

Since the dimensions for the bolt 1 or the socket wrench 2 must be practical values, $R_1$ and $R_2$ cannot be set to voluntary values. In light of this, calculation will be performed on the basis of a standard hexagon bolt socket. Further, to this end, the aforementioned basic formulas (1)–(4) are modified to more simple forms.

In the case of the hexagon bolt, maximum contact portions are six corner portions and the distance between the axis of the bolt and each corner thereof is $2a/\sqrt{3}$, where $a = B/2$ (B represents "width across flat", i.e. the distance between two opposite sides with respect to the axis). In addition, if the distance between the axis of the hexagon bolt with six contacts and each corner thereof is converted to a corresponding distance $R_k$ in the torque transmission unit with four contacts of the invention, the distance $R_k$ is given by $$R_k = 6(2a/\sqrt{3})/4 = \sqrt{3} \cdot a$$

As is shown in FIG. 4A, it suffices if an end of the arc 3 with radius $R_1$ of each curved outer peripheral surface 3 is situated in a position displaced by a distance e from a point apart from the axis by the distance $R_k$.

Figure 7:
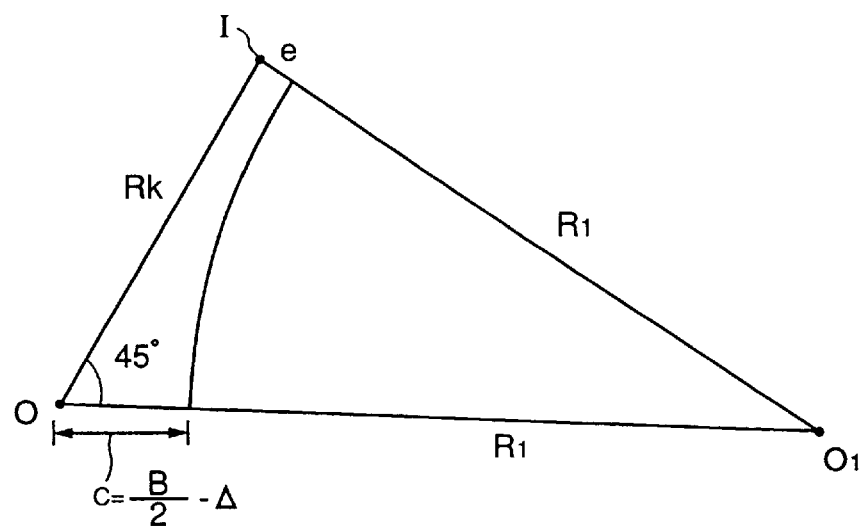
FIG. 7 is another view, useful in geometrically analyzing dimensions of the clamp members.

Moreover, if as shown in FIG. 7, the radius $R_1$ is set from a point c ($= B/2 - \Delta$) which is determined in light of the clearance Δ, the following equation is established concerning the triangle $IOO_2$ ($IO_2 = R_1 + e$) on the basis of the law of cosines:

$$(R_1 + e)^2 = (R_1 + c)^2 + R_k^2 - 2R_k(R_1 + c) \cos 45°$$

From the above equation, $R_1$ is determined as follows:

$$R_1 = (R_k^2 + c^2 - e^2 - \sqrt{2}R_k c)/(\sqrt{2}R_k - 2(c - e))$$

Supposing that contact radius R at the time of clamping is half the width across corners of the bolt of the "width across flat" B, the following is established:

$$R = \sqrt{2}a$$

$$h_1 = c + R_1 = B/2 - \Delta + R_1$$

$$\cos \theta = (R_1^2 + h_1^2 - R^2)/(2R_1 h_1)$$

$$\sin \theta_1 = h_2 \sin \theta / R$$

On the other hand, $R_2$ is obtained in the following manner:

From FIG. 6, $$h_2 = B/2 + R_2 = a + R_2$$

From the law of cosines, $$(R_2 + a)^2 = R_2 + R_2^2 - 2RR_2 \cos \theta_1$$

$$\therefore R_2 = (R^2 - a^2)/\{2(a - R \cos \theta_1)\}$$

Play $\theta_2$ between the clamp members is expressed by $\sin \theta_2 = \epsilon \cdot \sin \theta / h_2$ This means that when the clamp members rotate through $\theta_2$, the curved outer peripheral and inner peripheral surfaces of the members contact each other. In the actual calculation, first, $R_1$ is determined on the basis of B, e, $R_k$ and Δ, and then $R_2$ is determined from $R_1$ and R. Calculation results are shown in FIGS. 8, 9A and 9B. Although the "width across flat" B of the bolt 1 of the invention is determined on the basis of a hexagon bolt of the same normal radius as the bolt 1, the "width across flat" B of the bolt 1 does not correspond to that of the hexagon bolt in light of design, mainly, clearance. In addition, the values shown in FIGS. 8, 9A and 9B are merely examples, and it is a matter of course that they must be slightly modified at the time of actually designing the torque transmission unit.

In the examples in FIGS. 8, 9A and 9B, all values of tan α are greater than 1, which means that they are sufficiently high to prevent self-locking of the contact portions of the bolt and the socket wrench (i.e. to prevent the contact portions from elastically deforming and eating into each other).

The invention is not limited to the above-described embodiment, but may be modified in various manners without departing from its scope.

For example, although in the embodiment, the bolt with curved outer peripheral surfaces is used as a member to be fastened, and the socket wrench with curved inner peripheral surfaces is used as a fastening member, a screw with curved inner peripheral surfaces may be used as the member to be fastened, and a driver with curved outer peripheral surfaces may be used as the fastening member. Alternatively, the female clamp member may be formed of a bolt with a hole having curved inner peripheral surfaces.

Furthermore, it is a matter of course that any other type torque transmission unit may be used, only if it transmits torque by putting into contact four curved outer peripheral surfaces and four curved inner peripheral surfaces, which are designed on the basis of a square.

Industrial Applicability

As described above, the torque transmission unit of the invention is free from, for example, the disadvantage that either a male clamp member or a female clamp member is deformed or rounded at the time of clamping. Further, in the invention, a relatively large clearance can be defined between the male and female clamp members, and hence the female clamp member can easily be fit on the outer periphery of the male clamp member. Thus, the invention is applicable to a bolt and a socket wrench, or a screw and a driver.

What is claimed is:

1. A torque transmission system comprising male and female clamp members to be engaged with each other for transmitting torque, wherein:
   the female clamp member has curved inner peripheral surfaces to be engaged with the male clamp member, the curved inner peripheral surfaces having a peripheral outline consisting of circular arcs which circumscribe a first square such that each of the circular arcs contacts a center portion of a corresponding side of the first square;
   the male clamp member has curved outer peripheral surfaces to be engaged with the female clamp member, the curved outer peripheral surfaces of the male clamp member having a peripheral outline consisting of circular arcs which circumscribe a second square smaller than the first square such that each of the circular arcs of the male clamp member contacts a center portion of a corresponding side of the second square;
   the relative size of the first square with respect to the second square being selected such that when the female and male members are rotated relative to each other through a predetermined angle, the curved inner peripheral surfaces of the female clamp member contact the curved outer peripheral surfaces of the male clamp member, whereby locking of the female and male clamp members occurs in a predetermined contact position;
   the curved inner peripheral surfaces of the female clamp member and the curved outer peripheral surfaces of the male clamp member circumscribe a third square in the predetermined contact position in which the locking occurs whereat said first, second, and third squares have a common axis; and
   the locking is released when each of the female and male clamp members is rotated in a direction opposite to the direction of the first-mentioned rotation.

2. A torque transmission member according to claim 1, wherein the third square which inscribes both the female and male clamp members at the time of the locking has a size different from the first and second squares.

3. A torque transmission system according to claim 1, wherein each circular arc of the female clamp member has a curvature smaller than each circular arc of the male clamp member.

4. A torque transmission system according to claim 1, wherein the axis of rotation of the male clamp member is identical to the axis of rotation of the female clamp member when the male and female clamp members are rotated after the male and female clamp members are rotated relative to each other and the curved outer peripheral surfaces of the male clamp member contact the curved inner peripheral surface of the female clamp member.

5. A torque transmission system comprising male and female clamp members to be engaged with each other for transmitting torque, wherein:
   the female clamp member has curved inner peripheral surfaces to be engaged with the male clamp member, the curved inner peripheral surfaces having a peripheral outline consisting of circular arcs which circumscribe a first square such that each of the circular arcs contacts a center portion of a corresponding side of the first square;
   the male clamp member has curved outer peripheral surfaces to be engaged with the female clamp member, the curved outer peripheral surfaces of the male clamp member having a peripheral outline consisting of circular arcs which circumscribe a second square smaller than the first square such that each of the circular arcs of the male clamp member contacts a center portion of a corresponding side of the second square;
   the relative size of the first square with respect to the second square being selected such that when the female and male members are rotated in a first direction relative to each other through a predetermined angle, the curved inner peripheral surfaces of the female clamp member contact the curved outer peripheral surfaces of the male clamp member at four contact areas each within the circular arc of the respective curved surfaces, whereby locking of the female and male clamp members occurs in a predetermined contact position such that the further relative rotation in the first direction transmits torque between said clamp members in a direction perpendicular to said inner and outer peripheral surfaces at the four contact areas.

6. A torque transmission system according to claim 5 wherein said female member is a socket for a wrench and said male member is a head of a bolt.

7. A torque transmission system according to claim 5 wherein said female member is defined in the head of a screw and said male member is embodied in a driver.

8. A torque transmission system according to claim 1 wherein said female member is a socket for a wrench and said male member is a head of a bolt.

9. A torque transmission system according to claim 1 wherein said female member is defined in the head of a screw and said male member is embodied in a driver.

* * * * *